(No Model.)

G. E. PROCTOR.
CURLING IRON HEATER.

No. 513,530. Patented Jan. 30, 1894.

Witnesses
Albert Speiden
Sylvester Brown

Inventor
George E. Proctor.
By his Attorneys
Baldwin Davidson & Wight.

UNITED STATES PATENT OFFICE.

GEORGE E. PROCTOR, OF WASHINGTON, DISTRICT OF COLUMBIA.

CURLING-IRON HEATER.

SPECIFICATION forming part of Letters Patent No. 513,530, dated January 30, 1894.

Application filed April 19, 1893. Serial No. 471,008. (No model.)

*To all whom it may concern:*

Be it known that I, GEORGE E. PROCTOR, a citizen of the United States, residing at Washington, in the District of Columbia, have invented certain new and useful Improvements in Curling-Iron Heaters, of which the following is a specification.

The object of my invention is to provide a simple, efficient and inexpensive device for heating curling irons, which may be readily applied to an ordinary gas bracket and readily detached therefrom.

Figure 1:
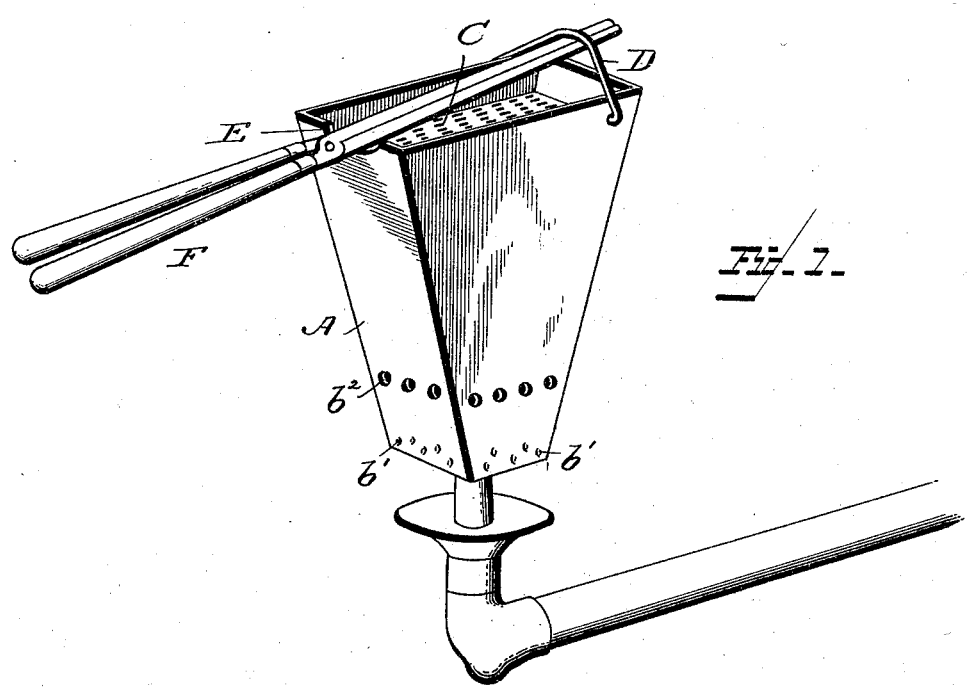
Figure 2:
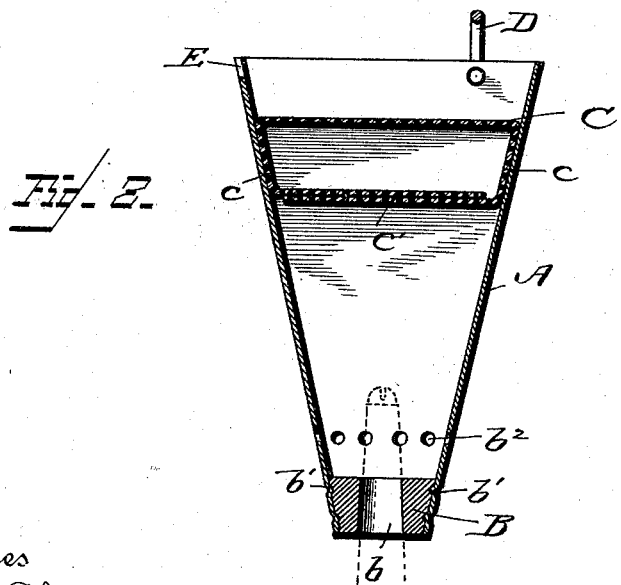

In the accompanying drawings, illustrating my invention, Figure 1 is a perspective view of my improved curling iron heater applied to a gas bracket, and holding a curling iron. Fig. 2 is a vertical, central section of the heater.

The body or casing A, is frustrum-shaped. At the lower or smaller end is secured a plug B, which is centrally perforated at $b$ to fit over an ordinary gas burner. The plug may be of wood or similar material and may be secured within the casing in any suitable way, as by burrs $b'$ formed by punching inwardly the sheet metal of which the body or casing A, is made. Above the plug, the casing is perforated at $b^2$, to admit air at or near the burner tip, in order that the air may be mingled with the gas to permit combustion and produce a hot flame, as in a Bunsen burner.

Near the top of the casing, but below the upper edge thereof, I provide a perforated diaphragm C, in order to confine the flame to the upper part of the heater. This diaphragm is shown as formed with downwardly projecting inclined sides $c$ which are shown as prolonged laterally and inwardly, and overlapping at $c'$, but the overlapping portions $c'$ may be omitted, if desired.

By the construction shown, it will be seen that supplemental securing devices may be omitted, as by forcing the diaphragm downwardly, it will be wedged into place and securely held there.

At the upper edge of the casing I secure a loop or bail D, and form in one of the side edges a notch or recess E. The curling iron F, is made to rest in the recess E, as indicated in Fig. 1, and the outer ends of the irons are arranged beneath the bail D. By this means, the irons are held in place, the weight of the handles tending to press the prongs against the bail, and sufficient friction is thereby produced to hold the irons in place in or over the flame.

The heater is extremely simple and inexpensive. It can be readily applied to and removed from an ordinary gas burner, and the irons may be heated quickly without being smoked.

I claim as my invention—

1. A curling iron heater comprising a casing having the notch E, and the bail or loop D at its upper end for the purpose specified, and a perforated diaphragm arranged in the casing at its upper end.

2. A curling iron heater comprising a frustum-shaped casing, having a perforated plug in its lower end, a notch or recess, and a bail or loop at its upper end, and a perforated diaphragm arranged in the casing at its upper end.

In testimony whereof I have hereunto subscribed my name.

GEORGE E. PROCTOR.

Witnesses:
J. MARTIN PROCTOR,
ARTHUR O'NEILL.